(12) United States Patent
Sullivan (10) Patent No.: US 11,847,910 B2
(45) Date of Patent: Dec. 19, 2023

(54) EMERGENCY VEHICLE ALERT SYSTEM

(71) Applicant: Kevin Sullivan, Patchogue, NY (US)

(72) Inventor: Kevin Sullivan, Patchogue, NY (US)

( * ) Notice: Subject to any disclaimer, the term of this patent is extended or adjusted under 35 U.S.C. 154(b) by 235 days.

(21) Appl. No.: 17/244,045

(22) Filed: Apr. 29, 2021

(65) Prior Publication Data

US 2022/0351617 A1    Nov. 3, 2022

(51) Int. Cl.
| | |
|---|---|
| *G08G 1/087* | (2006.01) |
| *G08G 1/01* | (2006.01) |
| *H04W 4/90* | (2018.01) |
| *H04W 4/44* | (2018.01) |
| *H04W 4/80* | (2018.01) |
| *B60Q 5/00* | (2006.01) |

(52) U.S. Cl.
CPC ........... *G08G 1/087* (2013.01); *B60Q 5/00* (2013.01); *G08G 1/0141* (2013.01); *H04W 4/44* (2018.02); *H04W 4/80* (2018.02); *H04W 4/90* (2018.02)

(58) Field of Classification Search
CPC ........ G08G 1/087; G08G 1/0141; B60Q 5/00; B60Q 9/00; H04W 4/44; H04W 4/80; H04W 4/90; B60K 2370/152; B60K 2370/157; B60K 2370/178; B60K 2370/589; B60K 2370/5915; B60K 35/00
See application file for complete search history.

(56) References Cited

U.S. PATENT DOCUMENTS

| | | | |
|---|---|---|---|
| 6,958,707 B1* | 10/2005 | Siegel | G08G 1/087 340/902 |
| 2007/0216539 A1* | 9/2007 | D'Antoni | G08G 1/0965 340/902 |
| 2017/0032670 A1* | 2/2017 | Poornachandran | G08G 1/096783 |

* cited by examiner

*Primary Examiner* — Omeed Alizada
(74) *Attorney, Agent, or Firm* — Erik B. Zarkowsky (57) ABSTRACT

An emergency vehicle alert system includes a traffic control device having a transceiver. The transceiver is configured to receive a first signal and to transmit a second signal. A receiver is configured to receive the second signal from the transceiver and to initiate an alert upon receiving the second signal from the transceiver. The first signal is transmitted to the transceiver from an emergency vehicle and causes the traffic control device to transition from a first configuration to a second configuration. The transceiver transmits the second signal in response to the transceiver receiving the first signal.

20 Claims, 5 Drawing Sheets

EMERGENCY VEHICLE ALERT SYSTEM

TECHNICAL FIELD

The present disclosure generally relates to vehicle alert systems, and more particularly to a system configured to initiate an alert upon receiving a signal from a traffic signal and to initiate an alert upon receiving a signal from an emergency vehicle.

BACKGROUND

It is imperative for emergency vehicles to travel through traffic as quickly as possible to get to their destinations. While increased speed is desirable to reduce the emergency vehicle's arrival time, the increased speed of the emergency vehicle makes an accident with another motor vehicle more likely. Most emergency vehicles are equipped with flashing lights and sirens to alert other motor vehicles in their paths. However, these precautions do not completely eliminate the risk of a nearby emergency vehicle to other motor vehicles. Indeed, an emergency vehicle coming from behind a motor vehicle cannot be seen or heard until the emergency vehicle is very close to the motor vehicle. This may not allow the driver of the motor vehicle sufficient time to react and maneuver to a location which does not obstruct the emergency vehicle. Even slower moving emergency vehicles create risks to motor vehicles as the emergency vehicles cross an intersection. It is very difficult for the drivers of oncoming traffic to see or hear an emergency vehicle in a congested intersection. The inability of sirens and emergency lights to fully warn motorists of an emergency vehicle's presence results in thousands of accidents each year.

There have been some proposed solutions to the limitations of sirens and emergency lights. One solution is the use of optical detectors on traffic lights that detect light signals emitted from an approaching emergency vehicle. The optical detector manipulates the traffic light for oncoming traffic by turning the traffic light red to allow the emergency vehicle to pass through the intersection without any other cars trying to move through the intersection. To increase the likelihood that the driver of a motor vehicle will be aware of a nearby emergency vehicle, some motor vehicles have been equipped with receivers that the detect light signals emitted from the approaching emergency vehicle and initiate an alert using the motor vehicle's entertainment system, for example. However, the motor vehicle may not receive the light signal from the emergency vehicle if the motor vehicle is not directly in the emergency vehicle's path, if the emergency vehicle is at a different elevation than the emergency vehicle, if there are any obstructions between the emergency vehicle and the motor vehicle, etc. This disclosure describes an improvement over these prior art technologies.

SUMMARY

In one embodiment, in accordance with the principles of the present disclosure, an emergency vehicle alert system comprises a traffic control device having a transceiver. The transceiver is configured to receive a first signal and to transmit a second signal. A receiver is configured to receive the second signal from the transceiver and to initiate an alert upon receiving the second signal from the transceiver. The first signal is transmitted to the transceiver from an emergency vehicle and causes the traffic control device to transition from a first configuration to a second configuration. The transceiver transmits the second signal in response to the transceiver receiving the first signal.

In one embodiment, a method is provided in accordance with the principles of the present disclosure, the method comprising: transmitting a first signal from an emergency vehicle to a transceiver of a traffic control device such that the first signal is received by the transceiver and the traffic control device transitions from a first configuration to a second configuration; sending a second signal from the transceiver to a receiver such that the second signal is received by the receiver, the second signal being transmitted in response to the transceiver receiving the first signal; and initiating an alert upon receiving the second signal from the transceiver.

In one embodiment, in accordance with the principles of the present disclosure, an emergency vehicle alert system comprises a traffic light comprising a transceiver. The transceiver is configured to receive a first signal and to transmit a second signal. A receiver is configured to receive the first signal and to initiate a first audible alert upon receiving the first signal. The receiver is configured to receive the second signal from the transceiver and to initiate a second audible alert upon receiving the second signal from the transceiver. The first signal is transmitted to the transceiver from an emergency vehicle and causes the traffic light to transition from a first configuration to a second configuration. The transceiver transmits the second signal in response to the transceiver receiving the first signal. The traffic light includes a first side that displays a green light when the traffic light is in the first configuration and displays a red light when the traffic light is in the second configuration.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of an emergency vehicle alert system, related components and methods of using the emergency vehicle alert system, in accordance with the principles of the present disclosure. Alternate embodiments are also disclosed. Reference will now be made in detail to the exemplary embodiments of the present disclosure, which are illustrated in the accompanying figures. Turning to FIGS. 1-5, there is illustrated components of an emergency vehicle alert system 10.

The components of emergency vehicle alert system 10 can be fabricated from materials including metals, polymers and/or composites, depending on the particular application. For example, the components of emergency vehicle alert system 10, individually or collectively, can be fabricated from materials such as aluminum, steel, iron, stainless steel, titanium, titanium alloys, cobalt-chrome, stainless steel alloys, semi-rigid and rigid materials, plastics, elastomers, rubbers and/or rigid polymers. Various components of emergency vehicle alert system 10 may have material composites, including the above materials, to achieve various desired characteristics such as strength, rigidity, elasticity, performance and durability. The components of emergency vehicle alert system 10, individually or collectively, may also be fabricated from a heterogeneous material such as a combination of two or more of the above-described materials. The components of emergency vehicle alert system 10 can be extruded, molded, injection molded, cast, pressed and/or machined. The components of emergency vehicle alert system 10 may be monolithically formed, integrally connected or include fastening elements and/or instruments, as described herein.

Emergency vehicle alert system 10 provides an improvement over conventional emergency vehicle alert systems as emergency vehicle alert system 10 provides two means to alert a motor vehicle 12 or a person in motor vehicle 12 of a nearby emergency vehicle 14. In particular, emergency vehicle 14 is equipped with a transceiver 16 configured to send a signal 18 from transceiver 16 to a transceiver 20 of a traffic control device, such as, for example, a traffic light 22. In response to receiving signal 18 from transceiver 16, transceiver 20 communicates with a component of traffic light 22, such as, for example a processor or controller, such that traffic light 22 transitions from a first configuration to a second configuration upon receiving signal 18 from transceiver 16. In some embodiments, traffic light 22 displays lights having a first color when traffic light 22 is in the firsts configuration and displays lights having a second color that is different than the first color. For example, in one embodiment, traffic light 22 includes one or a plurality of lights that are red when traffic light is in the first configuration and the one or a plurality of lights that were red when traffic light 22 was in the first configuration change to another color, such as, for example, green when traffic light 22 is in the second configuration. In some embodiments, traffic light 22 displays lights having a first color when traffic light 22 is in the firsts configuration and displays lights having a second color that is different than the first color. For example, in one embodiment, traffic light 22 includes one or a plurality of lights that are in a solid state (on and not flashing) when traffic light is in the first configuration and the one or a plurality of lights that were in the solid state when traffic light 22 was in the first configuration change to a flashing or strobe state when traffic light 22 is in the second configuration. In some embodiments, transceiver 16 is or includes a dedicated short-range communication transmitter. In some embodiments, transceiver 20 is or includes a dedicated short-range communication receiver. In some embodiments, emergency vehicle 14 is selected from a group consisting of a police vehicle, a fire truck, an ambulance, a school bus, a train, and a road maintenance vehicle. In some embodiments, the alert is selected from a group consisting of a buzzer, a horn, a lamp, an audio alarm, a warning light, a display screen, a lead-up display, a speech message, symbology on a display screen, a sound generated by a speaker, and a combination thereof.

In response to receiving signal 18 from transceiver 16, transceiver 20 is configured also to transmit a signal 24 from transceiver 20 to a receiver 26. That is, transceiver 20 will not transmit signal 24 from transceiver 20 to receiver 26 unless and until transceiver 20 receives signal 18 from transceiver 16. Upon receiving signal 24 from transceiver 20, receiver 26 is configured to initiate an alert, such as, for example, an audio alert. In some embodiments, receiver 26 is a component of motor vehicle 12 and is in communication with an entertainment system of motor vehicle 12 such that the audio alert is played through the entertainment system. In some embodiments, the alert is a visual alert that is displayed on a screen or other display of the entertainment system of motor vehicle 12. In some embodiments, receiver 26 is integrated into onboard electronics of motor vehicle 12, thus allowing receiver 26 to control certain functions of motor vehicle 12. In some embodiments, transceiver 16 is integrated into onboard electronics of emergency vehicle 14. Transceiver 16 is configured to operate when lights and/or sirens of emergency vehicle 14 are active. Receiver 26, through its integration into the electronics of motor vehicle 12, notifies the driver or occupant of motor vehicle 12 that emergency vehicle 14 is approaching. Examples of alerts that may be initiated by receiver 26 via the electronics of motor vehicle 12 to indicate that emergency vehicle 14 is nearby and/or approaching include, but are not limited to, flashing dashboard lights, outputting audible messages, reducing the volume of motor vehicle 12's audio system, interrupting telephone communication, or interrupting navigation system operation. In some embodiments, receiver 26 is a component of a smart phone 28 (FIG. 5) and is in communication with a speaker of smart phone 28 such that the audio alert is played through the speaker of smart phone 28. In some embodiments, the alert is a visual alert and receiver 26 is in communication with a screen or other display of smart phone 28 such that the visual alert is displayed on the screen of smart phone 28. In some embodiments, receiver 26 may be selectively turned on and off. For example, receiver 26 may be turned off during normal driving conditions, such as, for example, when traveling on a highway. Receiver 26 may then be turned from the off position to an on position during times when there is an increased amount of traffic, such as, for example, at an intersection. This may allow a user to have the option to have receiver 26 when motor vehicle is in an intersection or other high traffic area if the user does not wish to receive alerts about emergency vehicle 14. It is envisioned that receiver 26 may be turned on and off by the user in various ways, such as, for example, voice command, touchpad, push keys, knobs, buttons, dials, etc. Alternatively, receiver 26 may be configured to be turned on at all times in which motor vehicle 12 is in operation (e.g., is in the process of transporting from one location to another location) so that the user does not have to remember to turn receiver 26 on and/or receiver 26 is operational even if the user does not have the time to turn receiver 26 on, such as, for example, in cases of emergencies.

Figure 1:
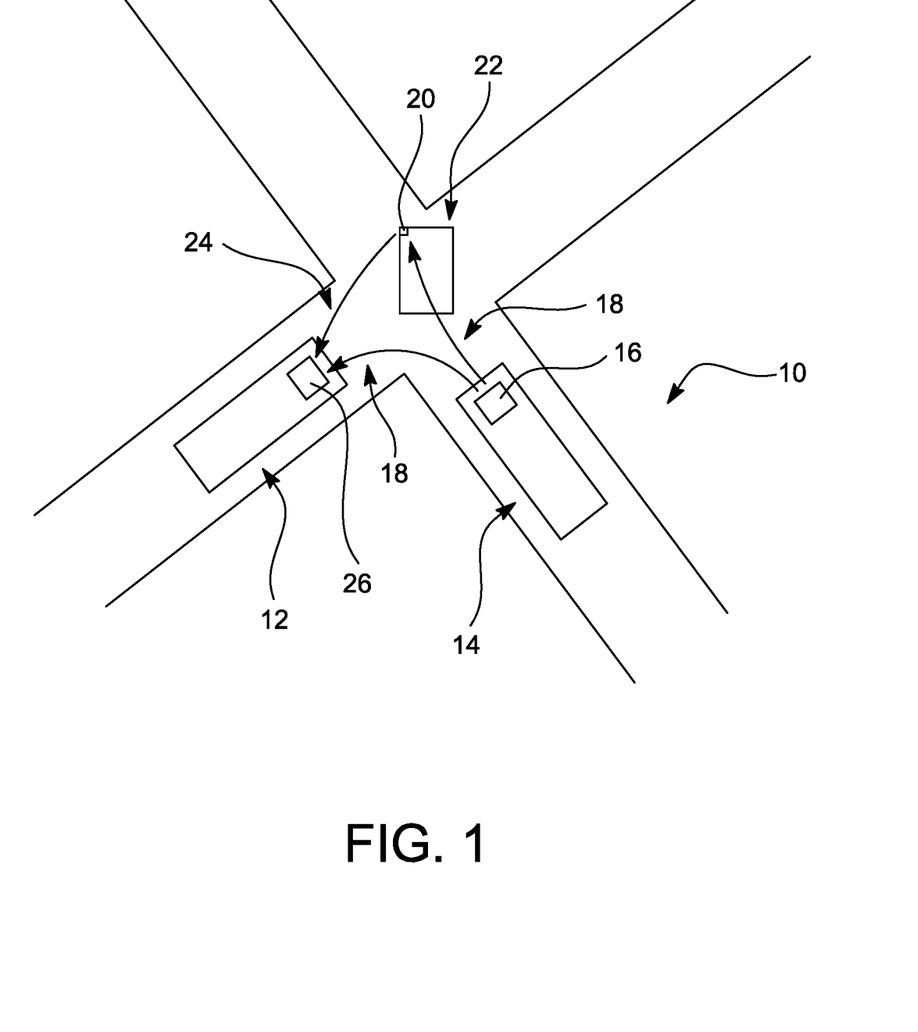
FIG. 1 is a diagram illustrating one embodiment of an emergency vehicle alert system, in accordance with the principles of the present disclosure.
Figure 2:
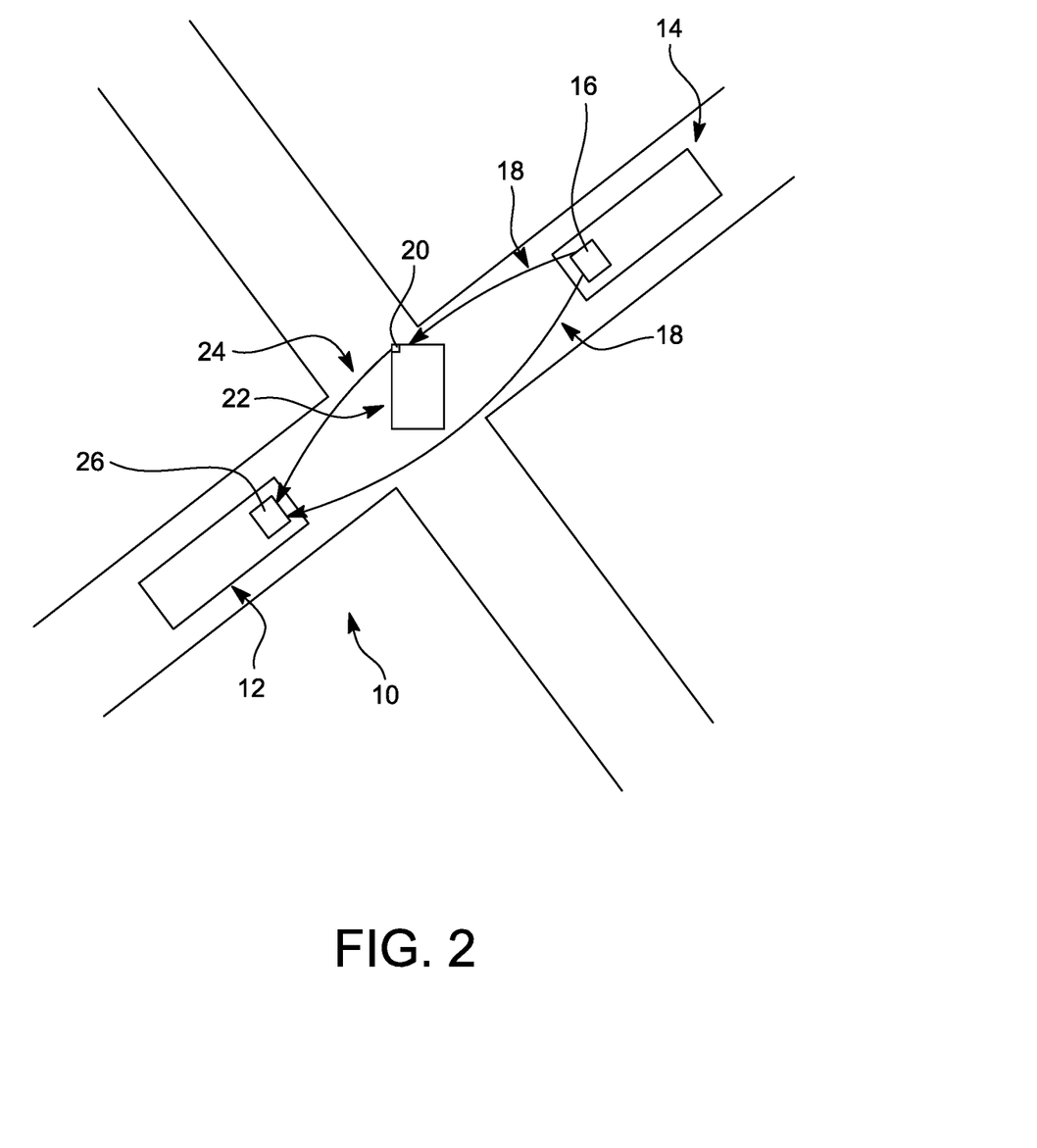
FIG. 2 is a diagram illustrating one embodiment of an emergency vehicle alert system, in accordance with the principles of the present disclosure.
Figure 3:
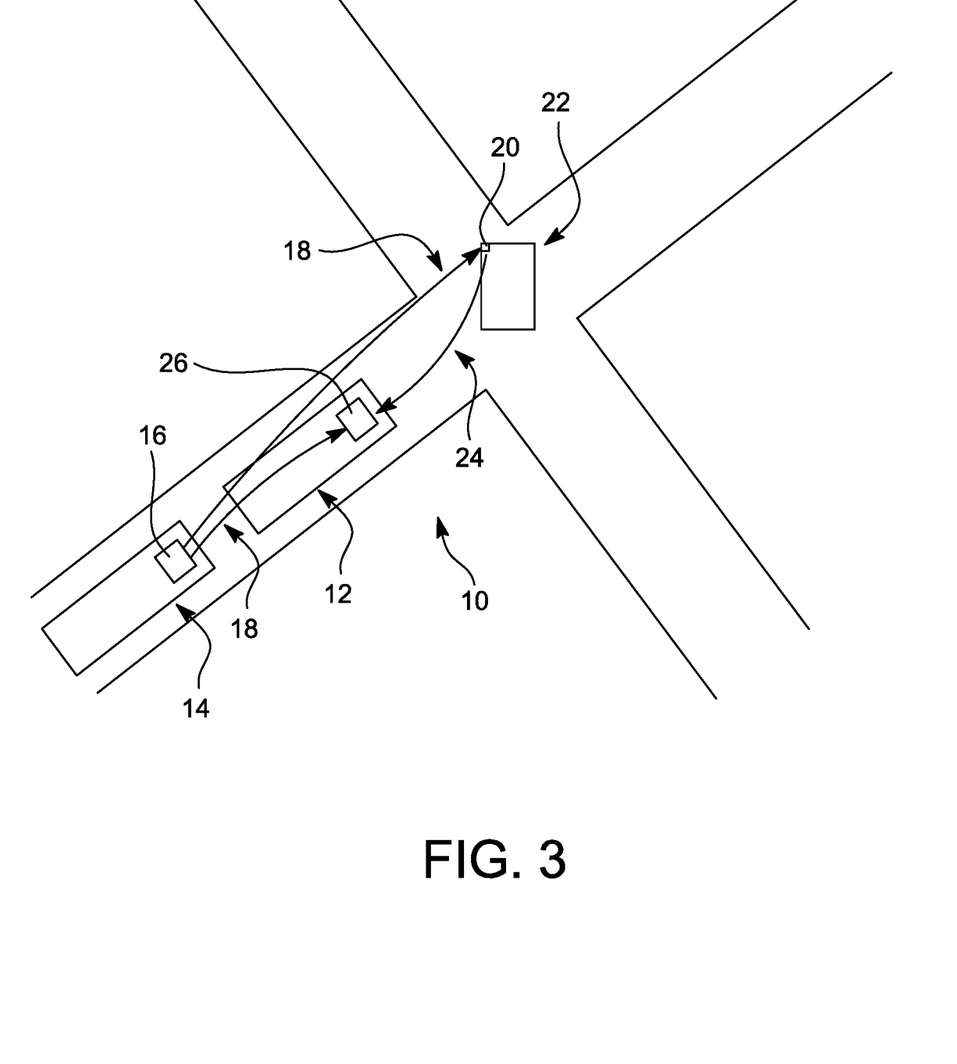
FIG. 3 is a diagram illustrating one embodiment of an emergency vehicle alert system, in accordance with the principles of the present disclosure.

In some embodiments, receiver 26 is configured to receive signal 18 from emergency vehicle 14 and to initiate an alert upon receiving signal 18 from emergency vehicle 14. That is, receiver 26 is configured to receive signal 18 and signal 24 simultaneously such that there are two signals from two separate and distinct devices that can cause receiver 26 to initiate an alert. In some embodiments, the alert initiated by signal 18 is the same as the alert initiated by signal 24. In some embodiments, the alert initiated by signal 18 is different than the alert initiated by signal 24. In some embodiments, the alert initiated by signal 18 is initiated at the same time that the alert initiated by single 24 is initiated. In some embodiments, the alert initiated by signal 18 is initiated at a different time than the alert initiated by single 24 is initiated. It is envisioned that by allowing receiver 26 to receiver to different signals from two different devices and initiate a response upon receiving each of the signals that will increase the likelihood of being alerted about emergency vehicle 14. For example, when motor vehicle 12 and emergency vehicle 14 are positioned on different streets, as shown in FIG. 1, receiver 26 may be better adapted to receive signal 24 than signal 18. Likewise, when motor vehicle 12 and emergency vehicle 14 are positioned on the same street with traffic signal 22 positioned between motor vehicle 12 and emergency vehicle 14, as shown in FIG. 2, receiver 26 may be better adapted to receive signal 24 than signal 18. However, when motor vehicle 12 and emergency vehicle 14 are positioned on the same street with motor vehicle 12 positioned between traffic signal 22 and emergency vehicle 14, as shown in FIG. 3, receiver 26 may be better adapted to receive signal 18 than signal 24.

In some embodiments, receiver 26 is configured to receive signal 18 from emergency vehicle 14 and to make selected alterations to motor vehicle 12. For example, system 10, including receiver 26 may turn certain audio features (e.g., speakers) of motor vehicle 12 off and/or lower the volume of such certain audio features of motor vehicle 12 such that people in motor vehicle 12 can better hear alerts from system 10. It is envisioned that certain speakers can exclusively play alerts from system 10 when receiver 26 receives signal 18 from emergency vehicle 14 and that speakers that are not exclusively playing alerts from system 10 can be turned off and/or the volume of such content playing from the speakers that are not exclusively playing alerts from system 10 can be lowered. Turning the speakers that are not exclusively playing alerts from system 10 off allows people in motor vehicle to best hear alerts from system 10. Lowering the volume of speakers that are not exclusively playing alerts from system 10 allows people in motor vehicle to hear alerts from system 10 while still hearing content directly from motor vehicle (e.g., radio) or another source that is integrated with motor vehicle (e.g., a smartphone).

It is envisioned that the speakers that are exclusively playing alerts from system 10 can be selected based on the direction that emergency vehicle 14 is approaching motor vehicle 12. For example, if system 10 determines that emergency vehicle 14 is approaching motor vehicle 12 toward the driver side of motor vehicle 12, receiver 26, through its integration into the electronics of motor vehicle 12, may cause speakers on the driver side of motor vehicle 12 to turn off (e.g., mute); the speakers on the passenger side of motor vehicle 12 will then exclusively play alerts from system 10. If system 10 determines that emergency vehicle 14 is approaching motor vehicle 12 toward the passenger side of motor vehicle 12, receiver 26, through its integration into the electronics of motor vehicle 12, may cause speakers on the passenger side of motor vehicle 12 to turn off (e.g., mute); the speakers on the driver side of motor vehicle 12 will then exclusively play alerts from system 10. If system 10 determines that emergency vehicle 14 is approaching motor vehicle 12 toward the front end of motor vehicle 12, receiver 26, through its integration into the electronics of motor vehicle 12, may cause speakers on the front end of motor vehicle 12 to turn off (e.g., mute); the speakers on the back end of motor vehicle 12 will then exclusively play alerts from system 10. If system 10 determines that emergency vehicle 14 is approaching motor vehicle 12 toward the back end of motor vehicle 12, receiver 26, through its integration into the electronics of motor vehicle 12, may cause speakers on the back end of motor vehicle 12 to turn off (e.g., mute); the speakers on the front end of motor vehicle 12 will then exclusively play alerts from system 10. Variations between the front end/passenger side, passenger side/back end, back end/driver side and driver side front end are also contemplated in connection with receiver 26 turning audio devices of motor vehicle 12 on and off (or lower in volume) based on the oncoming direction of emergency vehicle. For example, if system 10 determines that emergency vehicle 14 is approaching motor vehicle 12 from the front end/passenger side of motor vehicle 12, receiver 26 can cause the audio devices on the front end/passenger side of motor vehicle 12 to mute; in such instances receiver 26 could selectively turn audio devices on the back end/driver side of motor vehicle 12 on (or keep them on) such that the back end/driver side audio devise exclusively play alerts from system 10, as discussed herein.

In some embodiments, if system 10 determines that emergency vehicle 14 is approaching motor vehicle 12 toward the driver side of motor vehicle 12, receiver 26, through its integration into the electronics of motor vehicle 12, may cause speakers on the passenger side of motor vehicle 12 to turn off (e.g., mute); the speakers on the driver side of motor vehicle 12 will then exclusively play alerts from system 10. If system 10 determines that emergency vehicle 14 is approaching motor vehicle 12 toward the passenger side of motor vehicle 12, receiver 26, through its integration into the electronics of motor vehicle 12, may cause speakers on the driver side of motor vehicle 12 to turn off (e.g., mute); the speakers on the passenger side of motor vehicle 12 will then exclusively play alerts from system 10. If system 10 determines that emergency vehicle 14 is approaching motor vehicle 12 toward the front end of motor vehicle 12, receiver 26, through its integration into the electronics of motor vehicle 12, may cause speakers on the back end of motor vehicle 12 to turn off (e.g., mute); the speakers on the front end of motor vehicle 12 will then exclusively play alerts from system 10. If system 10 determines that emergency vehicle 14 is approaching motor vehicle 12 toward the front end of motor vehicle 12, receiver 26, through its integration into the electronics of motor vehicle 12, may cause speakers on the back end of motor vehicle 12 to turn off (e.g., mute); the speakers on the back end of motor vehicle 12 will then exclusively play alerts from system 10. Variations between the front end/passenger side, passenger side/back end, back end/driver side and driver side front end are also contemplated in connection with receiver 26 turning audio devices of motor vehicle 12 on and off (or lower in volume) based on the oncoming direction of emergency vehicle. For example, if system 10 determines that emergency vehicle 14 is approaching motor vehicle 12 from the front end/passenger side of motor vehicle 12, receiver 26 can cause the audio devices on the back end/driver side of motor vehicle 12 to mute; in such instances receiver 26 could selectively turn audio devices on the front end/passenger side of motor vehicle 12 on (or keep them on) such that the front end/passenger side audio devices exclusively play alerts from system 10, as discussed herein.

It is envisioned that motor vehicle can include a first array speakers and a second array of speakers and the volume of each array of speakers can be controlled by receiver. For example, in one embodiment, the volume that is played through each array of speakers can be selected based on the direction that emergency vehicle 14 is approaching motor vehicle 12. For example, if system 10 determines that emergency vehicle 14 is approaching motor vehicle 12 toward the driver side of motor vehicle 12, receiver 26, through its integration into the electronics of motor vehicle 12, may cause speakers on the driver side of motor vehicle 12 (the first array of speakers) to have a lower volume than speakers on the passenger side of motor vehicle 12 (the second array of speakers). This allows people in motor vehicle to hear emergency vehicle 14 as it approaches while also hearing alerts from system 20. If system 10 determines that emergency vehicle 14 is approaching motor vehicle 12 toward the passenger side of motor vehicle 12, receiver 26, through its integration into the electronics of motor vehicle 12, may cause speakers on the passenger side of motor vehicle 12 (the first array of speakers) to have a lower volume than speakers on the driver side of motor vehicle 12 (the second array of speakers). If system 10 determines that emergency vehicle 14 is approaching motor vehicle 12 toward the front end of motor vehicle 12, receiver 26, through its integration into the electronics of motor vehicle 12, may cause speakers on the front end of motor vehicle 12 (the first array of speakers) to have a lower volume than speakers on the back end of motor vehicle 12 (the second array of speakers). If system 10 determines that emergency vehicle 14 is approaching motor vehicle 12 toward the back end of motor vehicle 12, receiver 26, through its integration into the electronics of motor vehicle 12, may cause speakers on the back end of motor vehicle 12 (the first array of speakers) to have a lower volume than speakers on the front end of motor vehicle 12 (the second array of speakers). Variations between the front end/passenger side, passenger side/back end, back end/driver side and driver side front end are also contemplated in connection with determining the relative volume of the arrays of speakers based on the oncoming direction of emergency vehicle. For example, if system 10 determines that emergency vehicle 14 is approaching motor vehicle 12 from the front end/passenger side of motor vehicle 12, receiver 26 can cause the audio devices on the front end/passenger side of motor vehicle 12 (the first array) to have a lower volume than audio devices on the back end/driver side of motor vehicle 12 (the second array).

In some embodiments, if system 10 determines that emergency vehicle 14 is approaching motor vehicle 12 toward the driver side of motor vehicle 12, receiver 26, through its integration into the electronics of motor vehicle 12, may cause speakers on the driver side of motor vehicle 12 (the first array of speakers) to have a greater volume than speakers on the passenger side of motor vehicle 12 (the second array of speakers). The increased volume of the speakers on the passenger side of motor vehicle 12 (the second array of speakers) indicates to people in motor vehicle 12 the direction in which emergency vehicle 14 is approaching motor vehicle 12. If system 10 determines that emergency vehicle 14 is approaching motor vehicle 12 toward the passenger side of motor vehicle 12, receiver 26, through its integration into the electronics of motor vehicle 12, may cause speakers on the passenger side of motor vehicle 12 (the first array of speakers) to have a greater volume than speakers on the driver side of motor vehicle 12 (the second array of speakers). If system 10 determines that emergency vehicle 14 is approaching motor vehicle 12 toward the front end of motor vehicle 12, receiver 26, through its integration into the electronics of motor vehicle 12, may cause speakers on the front end of motor vehicle 12 (the first array of speakers) to have a greater volume than speakers on the back end of motor vehicle 12 (the second array of speakers). If system 10 determines that emergency vehicle 14 is approaching motor vehicle 12 toward the back end of motor vehicle 12, receiver 26, through its integration into the electronics of motor vehicle 12, may cause speakers on the back end of motor vehicle 12 (the first array of speakers) to have a greater volume than speakers on the front end of motor vehicle 12 (the second array of speakers). Variations between the front end/passenger side, passenger side/back end, back end/driver side and driver side front end are also contemplated in connection with determining the relative volume of the arrays of speakers based on the oncoming direction of emergency vehicle. For example, if system 10 determines that emergency vehicle 14 is approaching motor vehicle 12 from the front end/passenger side of motor vehicle 12, receiver 26 can cause the audio devices on the front end/passenger side of motor vehicle 12 (the first array) to have a greater volume than audio devices on the back end/driver side of motor vehicle 12 (the second array).

Figure 4:
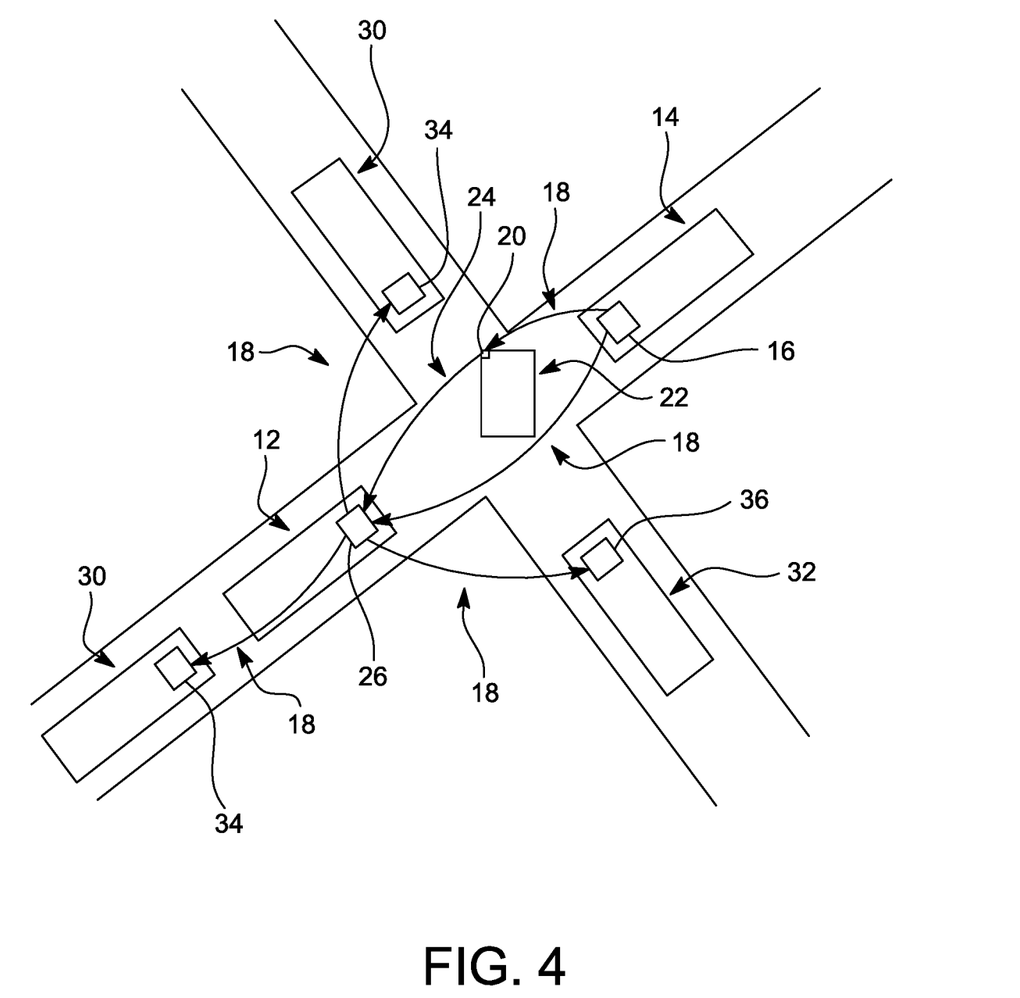
FIG. 4 is a diagram illustrating one embodiment of an emergency vehicle alert system, in accordance with the principles of the present disclosure.
Figure 5:
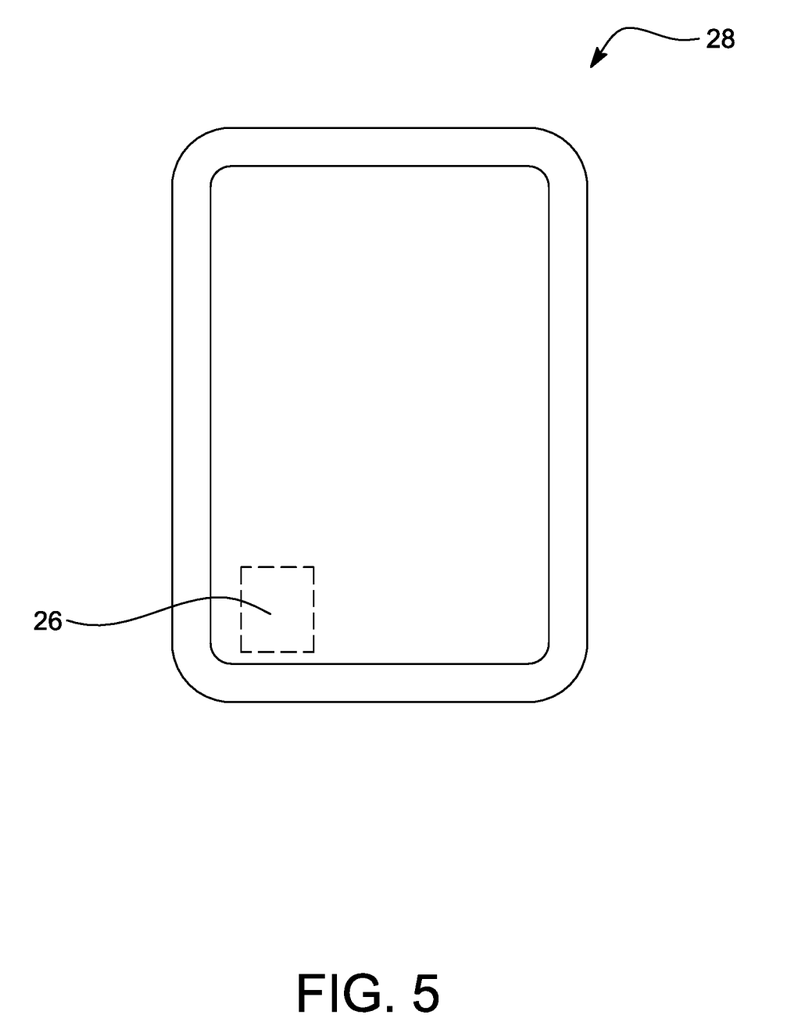
FIG. 5 is a perspective view of a component of an emergency vehicle alert system, in accordance with the principles of the present disclosure.

In some embodiments, receiver 26 and/or any other components of motor vehicle 12 that are in communication with receiver 26 and not capable of sending any signals that are the same or similar to signal 18 or signal 24. That is, emergency vehicle alert system 10 is not capable of sending any signal from receiver 26 or motor vehicle 12 to any other vehicle. In some embodiments, upon receiving signal 24 receiver 26 is configured to simultaneously sends the same signal that emergency vehicle 14 sends to traffic signal 18 and motor vehicle 14 to other motor vehicle, such as, a motor vehicle 30 and/or a motor vehicle 32, as shown in FIG. 4. In particular, upon receiving signal 18 from emergency vehicle 14, receiver 26 is configured to send signal 18 to a transceiver 34 of motor vehicle 30 and/or a transceiver 36 of motor vehicle 32 such that transceiver 34 and/or transceiver 36 can initiate an alert, which is the same or similar to the alerts discussed herein.

In some embodiments, receiver 26 is configured to receive signal 24 and only signal 24. That is, receiver 26 is not capable of receiving signals other than signal 24. In some embodiments, receiver 26 does not include memory capable of storing data and/or is not in communication with memory capable of storing data. In some embodiments, receiver 26 does not include a processor or other means to compare signals and/or is not in communication with a processor or other means to compare signals. In some embodiments, receiver 26 is in communication with the onboard electronics of motor vehicle 12 and is configured to be in an on position capable of receiving signal 24 from transceiver 20 at all times when the onboard electronics of motor vehicle 12 are on. In some embodiments, emergency vehicle alert system 10 is configured to fully operate with only motor vehicle 12 (including receiver 26), emergency vehicle 14 (including transceiver 16), and traffic light 22 (including transceiver 20). That is, emergency vehicle alert system 10 consists of emergency vehicle 14 (including transceiver 16), and traffic light 22 (including transceiver 20), wherein transceivers 16, 20 and receiver 26 are capable of respectively sending and receiving signals 18, 24. In some embodiments, signal 18 is not indicative of a location, such as, for example, a GPS location of emergency vehicle 14. In some embodiments, signal 24 is not indicative of a location, such as, for example, a GPS location of emergency vehicle 14. In some embodiments, motor vehicle 12 does not include a camera. In some embodiments, motor vehicle 12 does not include any unique identifying marks.

In some embodiments, receiver 26 is in communication with onboard electronics of motor vehicle 12 and the onboard electronics of motor vehicle 12 are in communication with a directional antenna that is fixed to motor vehicle 12. In some such embodiments, single 24 is received by the directional antenna and communicates with receiver 26 and the onboard electronics of motor vehicle 12 such that the alert initiated by receiver 26 indicates, audibly and/or visibly, the direction relative to motor vehicle 12 that emergency vehicle 14 is approaching. For example, the alert can be configured to provide an audible message through speakers in motor vehicle 12 and/or a visual display through a screen or other display of motor vehicle 12 that emergency vehicle 14 is approaching motor vehicle 12 from the driver side of motor vehicle 12, that emergency vehicle 14 is approaching motor vehicle 12 from the passenger side of motor vehicle 12, that emergency vehicle 14 is approaching motor vehicle 12 from the front of motor vehicle 12, or that emergency vehicle 14 is approaching motor vehicle 12 from the back of motor vehicle 12. In some embodiments, the alert can be configured to provide an audible message through speakers in motor vehicle 12 and/or a visual display through a screen or other display of motor vehicle 12 that emergency vehicle 14 is a given distance (1 mile, ½ mile, ¼ mile, etc.) away from motor vehicle. In some embodiments, the alert can be configured to provide an audible message through speakers in motor vehicle 12 and/or a visual display through a screen or other display of motor vehicle 12 that emergency vehicle 14 will be in the same intersection as motor vehicle within a given amount of time (10 seconds, 30 seconds, 1 minute, 5 minutes, etc.).

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. An emergency vehicle alert system comprising:
   a traffic control device comprising a transceiver, the transceiver being configured to receive a first signal from a first vehicle and to transmit a second signal; and
   a receiver positioned in a second vehicle, the receiver being configured to receive the second signal from the transceiver and to initiate an alert upon receiving the second signal from the transceiver,
   wherein the alert indicates a direction in which the first vehicle is approaching the second vehicle,
   wherein the first signal is transmitted to the transceiver from an emergency vehicle and causes the traffic control device to transition from a first configuration to a second configuration, and
   wherein the transceiver transmits the second signal in response to the transceiver receiving the first signal.

2. The emergency vehicle alert system recited in claim 1, wherein the alert is a first alert and the receiver is configured to receive the first signal and to initiate a second alert after receiving the first signal.

3. The emergency vehicle alert system recited in claim 2, wherein the second alert is different than the first alert.

4. The emergency vehicle alert system recited in claim 1, wherein the traffic control device is a traffic light, the traffic light including a first side that displays a green light when the traffic control device is in the first configuration and displays a red light when the traffic control device is in the second configuration.

5. The emergency vehicle alert system recited in claim 1, wherein the transceiver comprises a dedicated short-range communication transmitter configured to transmit the second signal to the receiver.

6. The emergency vehicle alert system recited in claim 1, wherein the alert is an audible alert.

7. The emergency vehicle alert system recited in claim 1, further comprising a smart phone, the smart phone comprising the receiver.

8. The emergency vehicle alert system recited in claim 1, further comprising a smart phone, the smart phone comprising the receiver, a speaker and a display, the receiver being configured to initiate the alert through at least one of the speaker and the display.

9. The emergency vehicle alert system recited in claim 1, further comprising the second vehicle, the second vehicle comprising the receiver.

10. The emergency vehicle alert system recited in claim 1, further comprising the second vehicle, the second vehicle comprising the receiver and an entertainment system, the receiver being configured to initiate the alert through the entertainment system.

11. A method of indicating a nearby emergency vehicle, the method comprising:
    transmitting a first signal from an emergency vehicle to a transceiver of a traffic control device such that the first signal is received by the transceiver and the traffic control device transitions from a first configuration to a second configuration;
    sending a second signal from the transceiver to a receiver positioned in a second vehicle such that the second signal is received by the receiver, the second signal being transmitted in response to the transceiver receiving the first signal; and
    initiating an alert upon receiving the second signal from the transceiver,
    wherein the alert indicates a direction in which the emergency vehicle is approaching the second vehicle.

12. The method recited in claim 11, further comprising:
the receiver receiving the first signal from the emergency vehicle; and
initiating a second alert upon receiving the first signal from the emergency vehicle.

13. The method recited in claim 12, wherein the second alert is different than the first alert.

14. The method recited in claim 12, wherein the first alert and the second alert are initiated simultaneously.

15. The method recited in claim 12, wherein the first alert and the second alert are initiated at different times.

16. The method recited in claim 10, wherein the receiver is a component of a smart phone.

17. The method recited in claim 10, wherein the receiver is a component of a smart phone, the smart phone comprising a speaker and a display, the receiver initiating the alert through at least one of the speaker and the display.

18. The method recited in claim 10, wherein the receiver is a component of a vehicle.

19. The method recited in claim 10, wherein the receiver is a component of the second vehicle, the second vehicle comprising an entertainment system, the receiver initiating the alert through the entertainment system.

20. An emergency vehicle alert system comprising:
a traffic light comprising a transceiver, the transceiver being configured to receive a first signal from a first vehicle and to transmit a second signal; and
a receiver positioned in a second vehicle, the receiver being configured to receive the first signal and to initiate a first audible alert upon receiving the first signal, the receiver being configured to receive the second signal from the transceiver and to initiate a second audible alert upon receiving the second signal from the transceiver,
wherein the alert indicates a direction in which the first vehicle is approaching the second vehicle,
wherein the first signal causes the traffic light to transition from a first configuration to a second configuration, and
wherein the transceiver transmits the second signal in response to the transceiver receiving the first signal, and
wherein the traffic light includes a first side that displays a green light when the traffic light is in the first configuration and displays a red light when the traffic light is in the second configuration.

\* \* \* \* \*